(12) United States Patent
Chan

(10) Patent No.: US 11,165,348 B2
(45) Date of Patent: Nov. 2, 2021

(54) BOOST CONVERTER WITH HIGH OUTPUT EFFICIENCY

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/832,258

(22) Filed: Mar. 27, 2020

(65) Prior Publication Data

US 2021/0175802 A1 Jun. 10, 2021

(30) Foreign Application Priority Data

Dec. 4, 2019 (TW) .................................. 108144239

(51) Int. Cl.
*H02M 3/158* (2006.01)
*H02M 7/217* (2006.01)

(52) U.S. Cl.
CPC ........... *H02M 3/158* (2013.01); *H02M 7/217* (2013.01)

(58) Field of Classification Search
CPC .............................. H02M 3/158; H02M 7/217
See application file for complete search history.

(56) References Cited

U.S. PATENT DOCUMENTS

| 6,108,218 | A | 8/2000 | Igarashi et al. | |
| 6,304,065 | B1 * | 10/2001 | Wittenbreder | ........ H02M 3/005 323/225 |
| 9,287,792 | B2 | 3/2016 | Telefus et al. | |
| 9,407,136 | B2 | 8/2016 | Hung et al. | |
| 10,186,985 | B1 | 1/2019 | Tao et al. | |
| 10,361,619 | B2 | 7/2019 | Vangala et al. | |
| 2010/0067259 | A1 * | 3/2010 | Liu | ................... H02M 3/33569 363/21.01 |

(Continued)

FOREIGN PATENT DOCUMENTS

| CN | 103595253 A | 2/2014 |
| CN | 204707032 A | 10/2015 |
| TW | 420898 B | 2/2001 |

(Continued)

OTHER PUBLICATIONS

Chinese language office action dated Mar. 5, 2020, issued in application No. TW 108144239.

*Primary Examiner* — Rafael O De Leon Domenech

(74) *Attorney, Agent, or Firm* — McClure, Qualey & Rodack, LLP

(57) ABSTRACT

A boost converter includes a first inductor, a power switch element, a tuning circuit, and an output stage circuit. The first inductor is configured to receive an input voltage. A parasitic capacitor is built in the power switch element. The power switch element selectively couples the first inductor to a ground voltage according to a clock voltage. The output stage circuit is configured to generate an output voltage. The tuning circuit includes a second inductor, a third inductor, and a current-limiting path. The second inductor is coupled to the first inductor and the power switch element. The third inductor is coupled through the current-limiting path to the output stage circuit. The first inductor, the second inductor, and the third inductor are mutually coupled to each other, so as to form an equivalent transformer.

11 Claims, 4 Drawing Sheets

(56) References Cited

U.S. PATENT DOCUMENTS

2012/0275198 A1* 11/2012 Cohen ............... H02M 3/33507
363/21.12
2017/0155335 A1   6/2017 Chang et al.

FOREIGN PATENT DOCUMENTS

TW    201607223 A    2/2016
TW    201828583 A    8/2018

* cited by examiner

BOOST CONVERTER WITH HIGH OUTPUT EFFICIENCY

CROSS REFERENCE TO RELATED APPLICATIONS

This application claims priority of Taiwan Patent Application No. 108144239 filed on Dec. 4, 2019, the entirety of which is incorporated by reference herein.

BACKGROUND OF THE INVENTION

Field of the Invention

The disclosure generally relates to a boost converter, and more specifically, to a boost converter with high output efficiency.

Description of the Related Art

In a conventional boost converter, each switch element may have a non-ideal parasitic capacitance. When the switch element is switched from a disable state to an enable state, it usually cannot complete a perfect ZVS (Zero Voltage Switching) operation. This reduces the output efficiency of the corresponding boost converter. Accordingly, there is a need to propose a novel solution for solving the problems of the prior art.

BRIEF SUMMARY OF THE INVENTION

In a preferred embodiment, the invention is directed to a boost converter that includes a first inductor, a power switch element, a tuning circuit, and an output stage circuit. The first inductor is configured to receive an input voltage. A parasitic capacitor is built in the power switch element. The power switch element selectively couples the first inductor to a ground voltage according to a clock voltage. The output stage circuit is configured to generate an output voltage. The tuning circuit includes a second inductor, a third inductor, and a current-limiting path. The second inductor is coupled to the first inductor and the power switch element. The third inductor is coupled through the current-limiting path to the output stage circuit. The first inductor, the second inductor, and the third inductor are mutually coupled to each other, so as to form an equivalent transformer.

In some embodiments, the first inductor and the second inductor are positioned at the same side of the equivalent transformer, and the third inductor is positioned at the opposite side of the equivalent transformer.

In some embodiments, the equivalent transformer is configured to balance the charging and discharging operations of the parasitic capacitor, so that the parasitic capacitor substantially stores no charge.

In some embodiments, the first inductor has a first terminal coupled to an input node for receiving the input voltage, and a second terminal coupled to a first node.

In some embodiments, the power switch circuit includes a transistor. The transistor has a control terminal for receiving the clock voltage, a first terminal coupled to the ground voltage, and a second terminal coupled to the first node.

In some embodiments, the parasitic capacitor has a first terminal coupled to the first node, and a second terminal coupled to the ground voltage.

In some embodiments, the output stage circuit includes a first diode and a capacitor. The first diode has an anode coupled to the first node, and a cathode coupled to an output node for outputting the output voltage. The capacitor has a first terminal coupled to the output node, and a second terminal coupled to the ground voltage.

In some embodiments, the second inductor has a first terminal coupled to the first node, and a second terminal coupled to the ground voltage.

In some embodiments, the third inductor has a first terminal coupled to a second node, and a second terminal coupled to the ground voltage.

In some embodiments, the current-limiting path includes a resistor and a second diode. The resistor has a first terminal coupled to the second node, and a second terminal coupled to a third node. The second diode has an anode coupled to the third node, and a cathode coupled to the output node.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
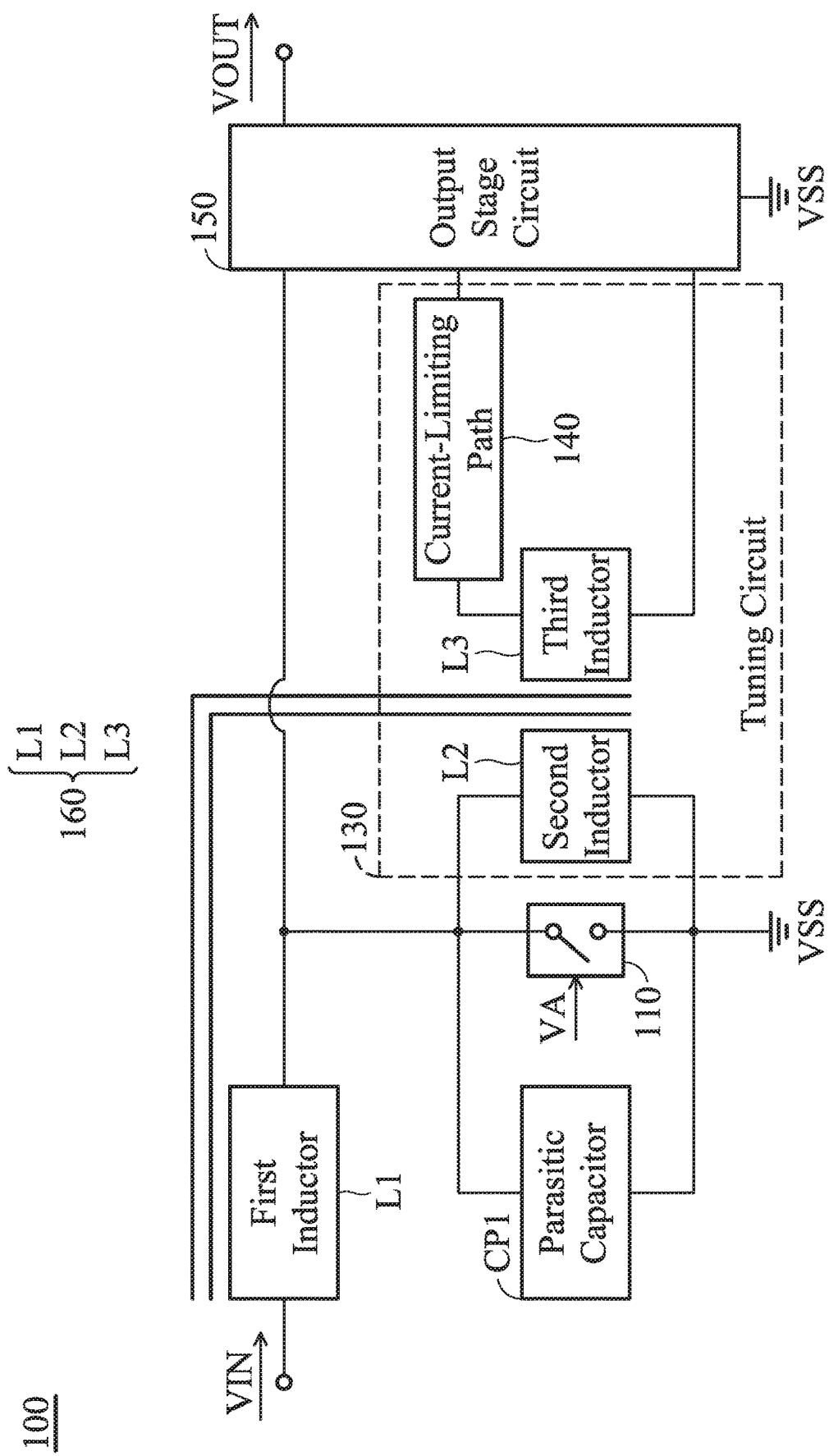
FIG. 1 is a diagram of a boost converter according to an embodiment of the invention.

FIG. 1 is a diagram of a boost converter 100 according to an embodiment of the invention. The boost converter 100 may be applied to a mobile device, such as a desktop computer, a notebook computer, or an all-in-one computer. As shown in FIG. 1, the boost converter 100 includes a first inductor L1, a power switch element 110, a tuning circuit 130, and an output stage circuit 150. A parasitic capacitor CP1 is built in the power switch element 110. The tuning circuit 130 includes a second inductor L2, a third inductor L3, and a current-limiting path 140. It should be noted that the boost converter 100 may further include other components, such as a voltage regulator and/or a negative feedback circuit, although they are not displayed in FIG. 1.

The first inductor L1 is considered as a boost inductor of the boost converter 100. The first inductor L1 is configured to receive an input voltage VIN. The input voltage VIN may be from an external power source. The input voltage VIN may be an AC (Alternating Current) voltage with any frequency and any magnitude. For example, the frequency of the AC voltage may be about 50 Hz or 60 Hz, and the RMS (Root-Mean-Square) value of the AC voltage may be about 110V or 220V. In alternative embodiments, adjustments are made such that the input voltage VIN is a DC (Direct Current) voltage, whose voltage level may be from 90V to 264V. The power switch element 110 selectively couples the first inductor L1 to a ground voltage VSS (e.g., 0V) according to a clock voltage VA. For example, if the clock voltage VA has a high logic level (e.g., logic "1"), the power switch element 110 may couple the first inductor L1 to the ground voltage VSS (i.e., the power switch element 110 may almost be a short-circuited path). Conversely, if the clock voltage VA has a low logic level (e.g., logic "0"), the power switch element 110 may not couple the first inductor L1 to the ground voltage VSS (i.e., the power switch element 110 may almost be an open-circuited path). The total parasitic capacitance between two terminals of the power switch element 110 is modeled as the aforementioned parasitic capacitor CP1, which is not an independent external component. When the boost converter 100 is initialized, the clock voltage VA may be maintained at a constant voltage. When the boost converter 100 is operating normally, the clock voltage VA can provide a periodical clock waveform. The tuning circuit 130 is coupled between the power switch element 110 and the output stage circuit 150, so as to compensate for the parasitic capacitor CP1 of the power switch element 110. Specifically, in the tuning circuit 130, the second inductor L2 is coupled to the first inductor L1 and the power switch element 110, and the third inductor L3 is coupled through the current-limiting path 140 to the output stage circuit 150. The output stage circuit 150 is configured to generate an output voltage VOUT. The output voltage VOUT may be a DC (Direct Current) voltage. The voltage level of the output voltage VOUT may be higher than the maximum value of the input voltage VIN. It should be noted that in the boost converter 100, the first inductor L1, the second inductor L2, and the third inductor L3 are mutually coupled to each other, so as to form an equivalent transformer 160. The first inductor L1 and the second inductor L2 may be positioned at the same side of the equivalent transformer 160, and the third inductor L3 may be positioned at the opposite side of the equivalent transformer 160. For example, the equivalent transformer 160 may be implemented with a common iron core which passes through central holes of the first inductor L1, the second inductor L2, and the third inductor L3, but it is not limited thereto. The equivalent transformer 160 is configured to balance the charging and discharging operations of the parasitic capacitor CP1, such that the parasitic capacitor CP1 substantially stores no charge. According to practical measurements, such a circuit design can suppress non-ideal characteristics of the parasitic capacitor CP1. Thus, the power switch element 110 can almost perform a lossless ZVS (Zero Voltage Switching) operation, and the output efficiency of the boost converter 100 is effective increased.

The following embodiments will introduce the detailed structure and operation of the boost converter 100. It should be understood these figures and descriptions are merely exemplary, rather than limitations of the invention.

Figure 2:
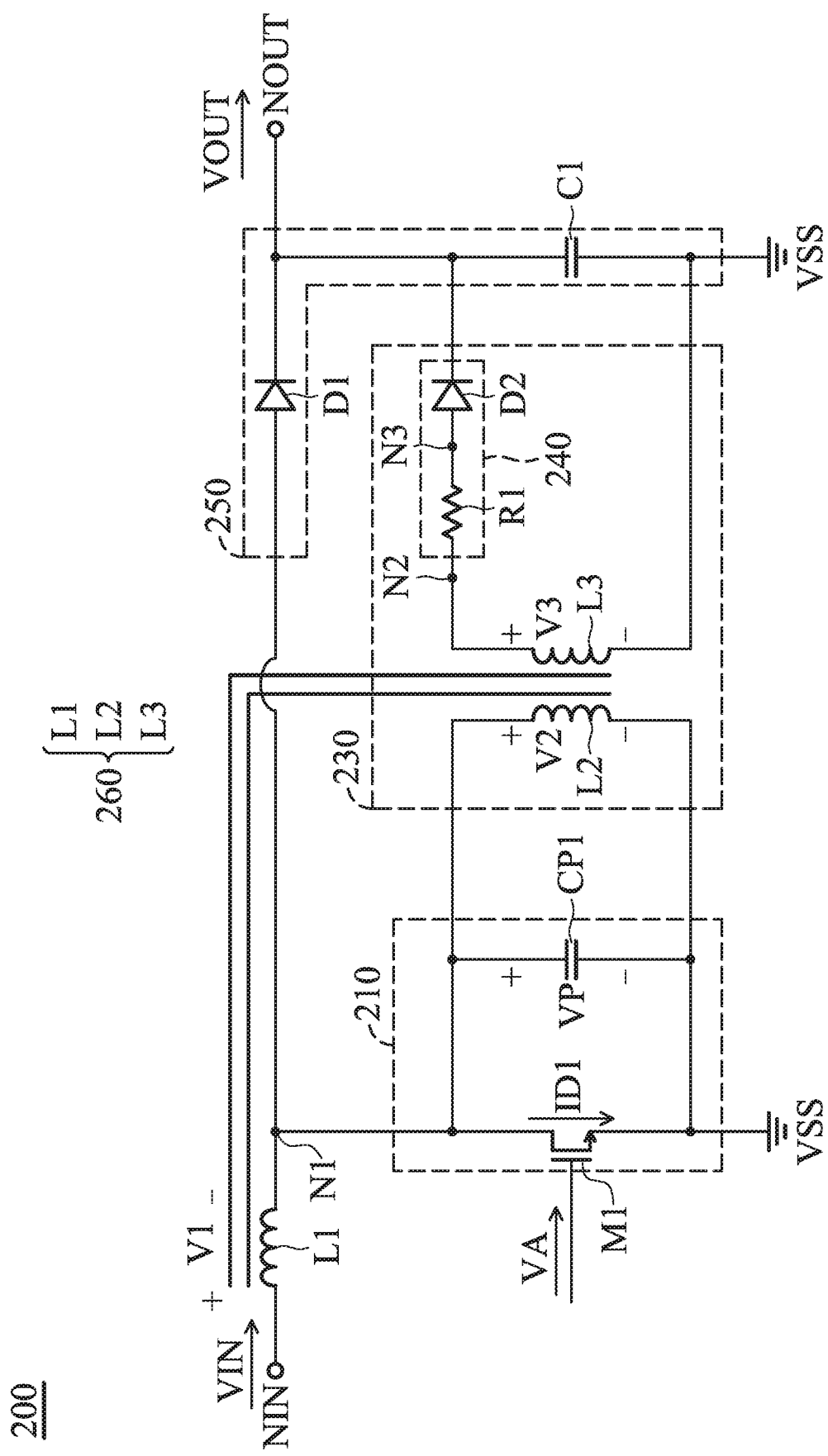
FIG. 2 is a diagram of a boost converter according to an embodiment of the invention.

FIG. 2 is a diagram of a boost converter 200 according to an embodiment of the invention. In the embodiment of FIG. 2, the boost converter 200 with an input node NIN and an output node NOUT includes a first inductor L1, a power switch element 210, a tuning circuit 230, and an output stage circuit 250. A parasitic capacitor CP1 is built in the power switch element 210. The tuning circuit 230 includes a second inductor L2, a third inductor L3, and a current-limiting path 240. The input node NIN of the boost converter 200 is arranged for receiving an input voltage VIN from an external power source. The output node NOUT of the boost converter 200 is arranged for outputting an output voltage VOUT. The voltage level of the output voltage VOUT may be higher than the maximum value of the input voltage VIN.

The first inductor L1 has a first terminal coupled to the input node NIN, and a second terminal coupled to a first node N1.

The power switch element 210 includes a transistor M1. The transistor M1 may be an NMOS transistor (N-type Metal Oxide Semiconductor Field Effect Transistor). The transistor M1 has a control terminal for receiving a clock voltage VA, a first terminal coupled to a ground voltage VSS, and a second terminal coupled to the first node N1. For example, when the boost converter 200 is initialized, the clock voltage VA may be maintained at a constant voltage (e.g., the ground voltage VSS). When the boost converter 200 is operating normally, the clock voltage VA can provide a periodical clock waveform. The total parasitic capacitance between the first terminal and the second terminal of the transistor M1 is modeled as the aforementioned parasitic capacitor CP, which is not an independent external component. The parasitic capacitor CP has a first terminal coupled to the first node N1, and a second terminal coupled to the ground voltage VSS.

The output stage circuit 250 includes a first diode D1 and a capacitor C1. The first diode D1 has an anode coupled to the first node N1, and a cathode coupled to the output node NOUT. The capacitor C1 has a first terminal coupled to the output node NOUT, and a second terminal coupled to the ground voltage VSS.

In the tuning circuit 230, the second inductor L2 has a first terminal coupled to the first node N1, and a second terminal coupled to the ground voltage VSS. On the other hand, the third inductor L3 has a first terminal coupled to a second node N2, and a second terminal coupled to the ground voltage VSS.

The current-limiting path 240 of the tuning circuit 230 includes a resistor R1 and a second diode D2. The resistor R1 has a first terminal coupled to the second node N2, and a second terminal coupled to a third node N3. The second diode D2 has an anode coupled to the third node N3, and a cathode coupled to the output node NOUT.

It should be noted that in the boost converter 200, the first inductor L1, the second inductor L2, and the third inductor L3 are mutually coupled to each other, so as to form an equivalent transformer 260. The first inductor L1 and the second inductor L2 may be positioned at the same side of the equivalent transformer 260, and the third inductor L3 may be positioned at the opposite side of the equivalent transformer 260. For example, the equivalent transformer 260 may be implemented with a common iron core which passes through central holes of the first inductor L1, the second inductor L2, and the third inductor L3, but it is not limited thereto. The equivalent transformer 260 is configured to balance the charging and discharging operations of the parasitic capacitor CP1, such that the parasitic capacitor CP1 substantially stores no charge.

In some embodiments, the boost converter 200 operates in a first mode and a second mode alternatively, and its detailed operation principles are described as follows.

In the first mode, the clock voltage VA has a high logic level, such that the first transistor M1 is enabled and the first diode D1 is disabled, and the parasitic capacitor CP1 is charged. At the same time, the second inductor L2 is mutually coupled to the first inductor L1, the second inductor L2 resonates with the parasitic capacitor CP1, and the third inductor L3 is mutually coupled to the second inductor L2. Thus, the parasitic capacitor CP1 is discharged concurrently, and the energy of the parasitic capacitor CP1 is indirectly transferred to the capacitor C1. That is, in the first mode, the parasitic capacitor CP1 is balanced in charging and discharging operations, and finally there is no charge/energy stored in the parasitic capacitor CP1.

In the second mode, the clock voltage VA has a low logic level, such that the first transistor M1 is disabled and the first diode D1 is enabled. At this time, the parasitic capacitor CP1 is neither charged nor discharged, and finally there are no charge/energy stored in the parasitic capacitor CP1.

Figure 3:
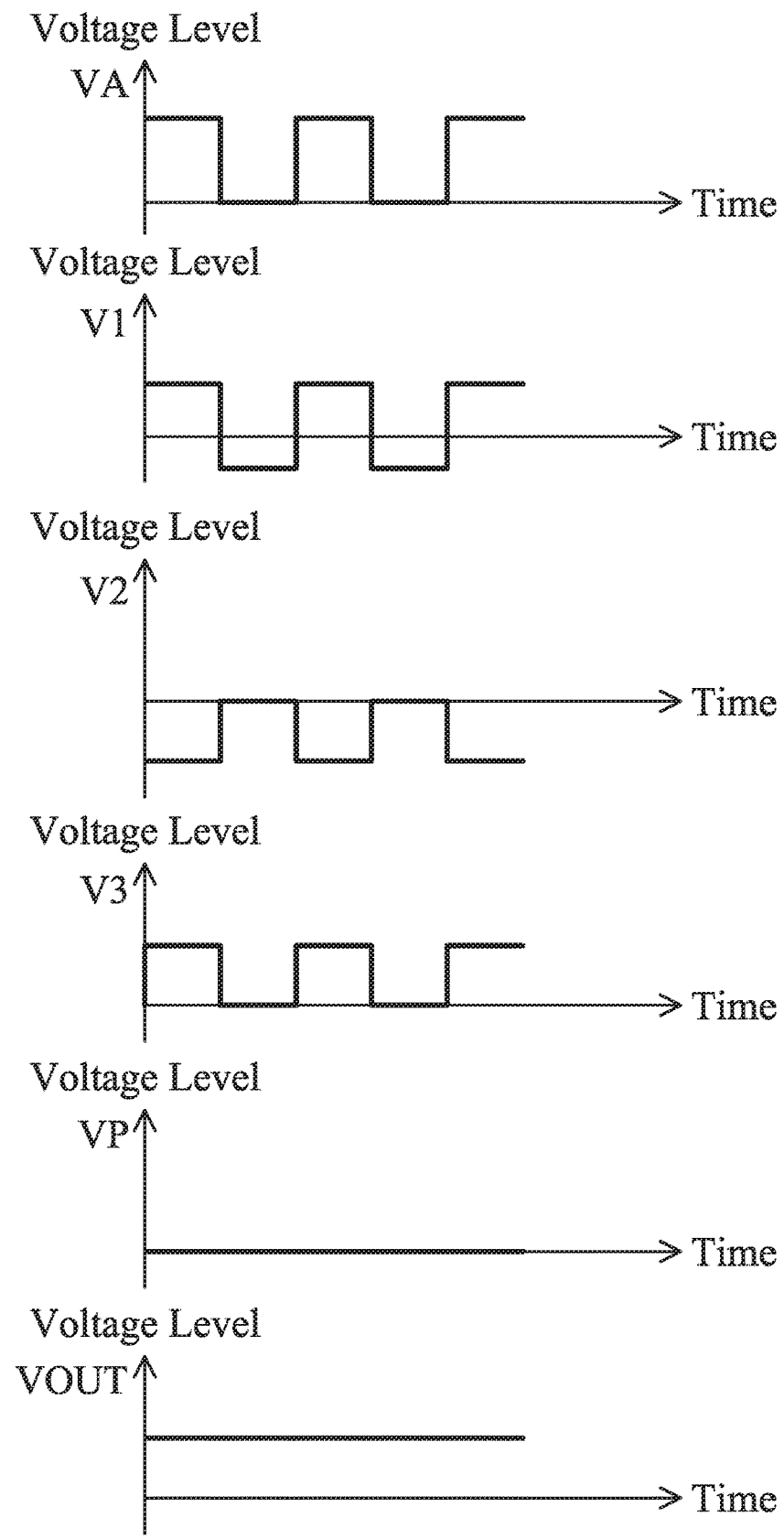
FIG. 3 is a diagram of voltage waveforms of a boost converter according to an embodiment of the invention.

FIG. 3 is a diagram of voltage waveforms of the boost converter 200 according to an embodiment of the invention. The horizontal axis represents time, and the vertical axis represents each voltage level. As shown in FIG. 3, the clock voltage VA has high and low logic intervals which are alternative and periodical. The voltage difference between the first terminal and the second terminal of the first inductor L1 is defined as a first voltage difference V1. The voltage difference between the first terminal and the second terminal of the second inductor L2 is defined as a second voltage difference V2. The voltage difference between the first terminal and the second terminal of the third inductor L3 is defined as a third voltage difference V3. The voltage difference between the first terminal and the second terminal of the parasitic capacitor CP1 is defined as a parasitic voltage difference VP. It is assumed that the first diode D1 and the second diode D2 are ideal diodes whose cut-in voltages are set to 0V. When the clock voltage VA is in the high logic interval, the current flowing through the first inductor L1 gradually becomes larger. At this time, the first voltage difference V1 of the first inductor L1 may be substantially equal to the input voltage VIN (i.e., V1=VIN), the second voltage difference V2 of the second inductor L2 may be substantially equal to the negative value of the input voltage VIN (i.e., V2=−VIN), and the third voltage difference V3 of the third inductor L3 may be substantially equal to the output voltage VOUT (i.e., V3=VOUT). Conversely, when the clock voltage VA is in the low logic interval, the current flowing through the first inductor L1 gradually becomes smaller. At this time, the first voltage difference V1 of the first inductor L1 may be substantially equal to the input voltage VIN minus the output voltage VOUT (i.e., V1=VIN−VOUT), the second voltage difference V2 of the second inductor L2 may be substantially equal to the ground voltage VSS (i.e., V2=0), and the third voltage difference V3 of the third inductor L3 may be substantially equal to the ground voltage VSS (i.e., V3=0). It should be noted that the parasitic voltage difference VP of the parasitic capacitor CP1 is unchanged and maintained at the ground voltage VSS (i.e., VP=0), regardless of the clock voltage VA being in the high logic interval or the low logic interval.

Figure 4:
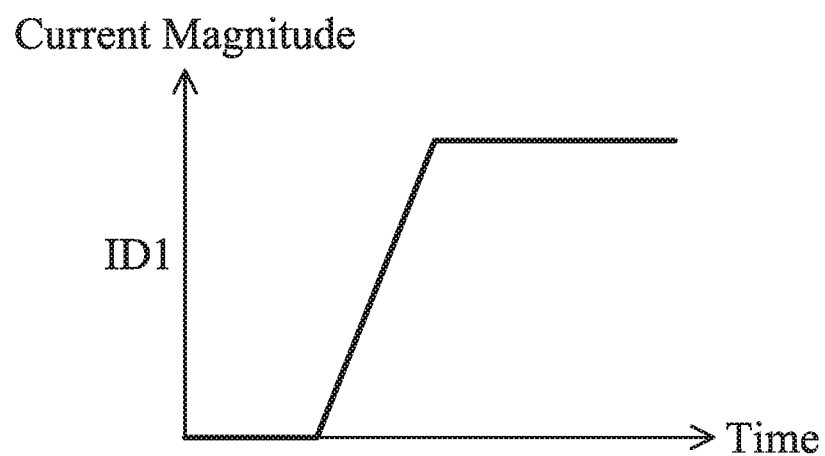
FIG. 4 is a diagram of a current waveform of a boost converter according to an embodiment of the invention.

FIG. 4 is a diagram of a current waveform of the boost converter 200 according to an embodiment of the invention. The horizontal axis represents time, and the vertical axis represents current magnitude. As shown in FIG. 4, if the tuning circuit 230 is used, the non-ideal characteristics of the parasitic capacitor CP1 will be effectively suppressed. When the power switch element 210 is switched from a disable state into an enable state, a current ID1 flowing through the transistor M1 gradually becomes larger. It should be noted that the parasitic voltage difference VP of the parasitic capacitor CP1 is completely discharged to 0 (as shown in the dotted-box of FIG. 4) before the current ID1 of the transistor M1 becomes larger. Therefore, the power switch element 210 can almost perform a lossless ZVS operation.

In some embodiments, the element parameters of the boost converter 200 are described as follows. The capacitance of the parasitic capacitor CP1 may be from 142.5 µF to 157.5 µF, such as 150 µF. The capacitance of the capacitor C1 may be from 612 µF to 748 µF, such as 680 µF. The inductance of the first inductor L1 may be from 570 µH to 630 µH, such as 600 µF. The inductance of the second inductor L2 may be from 38 µH to 42 µH, such as 40 µF. The inductance of the third inductor L3 may be from 190 µH to 210 µH, such as 200 µF. The resistance of the resistor R1 may be from 90Ω to 110Ω, such as 100Ω. The switching frequency of the clock voltage VA may be about 65 kHz. The above ranges of parameters are calculated and obtained according to the results of many experiments, and they help to optimize the transformation efficiency of the boost converter 200.

The invention proposes a novel boost converter which includes a tuning circuit and its current-limiting path. According to practical measurements, the boost converter using the aforementioned design can eliminate the non-ideal effect of the parasitic capacitance of the power switch element and almost achieve a lossless ZVS operation. Generally, the invention can effectively increase the output efficiency of the boost converter, and it is suitable for application in a variety of electronic devices.

Note that the above voltages, currents, resistances, inductances, capacitances and other element parameters are not limitations of the invention. A designer can adjust these parameters according to different requirements. The boost converter of the invention is not limited to the configurations of FIGS. 1-4. The invention may merely include any one or more features of any one or more embodiments of FIGS. 1-4. In other words, not all of the features displayed in the figures should be implemented in the boost converter of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with a true scope of the disclosed embodiments being indicated by the following claims and their equivalents.

What is claimed is:

1. A boost converter, comprising:
a first inductor, receiving an input voltage;

a power switch element, wherein a parasitic capacitor is built in the power switch element, and the power switch element selectively couples the first inductor to a ground voltage according to a clock voltage;

an output stage circuit, generating an output voltage; and a tuning circuit, comprising a second inductor, a third inductor, and a current-limiting path, wherein the second inductor is coupled to the first inductor and the power switch element, and the third inductor is coupled through the current-limiting path to the output stage circuit;

wherein the first inductor, the second inductor, and the third inductor are mutually coupled to each other, so as to form an equivalent transformer;

wherein the first inductor has a first terminal coupled to an input node for receiving the input voltage, and a second terminal coupled to a first node;

wherein the output stage circuit comprises:

a first diode, wherein the first diode has an anode coupled to the first node, and a cathode coupled to an output node for outputting the output voltage; and a capacitor, wherein the capacitor has a first terminal coupled to the output node, and a second terminal coupled to the ground voltage;

wherein the third inductor has a first terminal coupled to a second node, and a second terminal coupled to the ground voltage;

wherein the current-limiting path comprises:

a resistor, wherein the resistor has a first terminal coupled to the second node, and a second terminal coupled to a third node; and a second diode, wherein the second diode has an anode coupled to the third node, and a cathode coupled to the output node.

2. The boost converter as claimed in claim 1, wherein the first inductor and the second inductor are positioned at a same side of the equivalent transformer, and the third inductor is positioned at an opposite side of the equivalent transformer.

3. The boost converter as claimed in claim 1, wherein the equivalent transformer is configured to balance charging and discharging operations of the parasitic capacitor, such that the parasitic capacitor substantially stores no charge.

4. The boost converter as claimed in claim 1, wherein the power switch circuit comprises:

a transistor, wherein the transistor has a control terminal for receiving the clock voltage, a first terminal coupled to the ground voltage, and a second terminal coupled to the first node.

5. The boost converter as claimed in claim 1, wherein the parasitic capacitor has a first terminal coupled to the first node, and a second terminal coupled to the ground voltage.

6. The boost converter as claimed in claim 1, wherein the second inductor has a first terminal coupled to the first node, and a second terminal coupled to the ground voltage.

7. The boost converter as claimed in claim 1, wherein a capacitance of the parasitic capacitor is from 142.5 pF to 157.5 pF.

8. The boost converter as claimed in claim 1, wherein an inductance of the first inductor is from 570 μH to 630 μH.

9. The boost converter as claimed in claim 1, wherein an inductance of the second inductor is from 38 μH to 42 μH.

10. The boost converter as claimed in claim 1, wherein an inductance of the third inductor is from 190 μH to 210 μH.

11. The boost converter as claimed in claim 1, wherein a switching frequency of the clock voltage is about 65 kHz.

* * * * *